United States Patent
Tanaami et al.

(10) Patent No.: US 11,949,111 B2
(45) Date of Patent: *Apr. 2, 2024

(54) LITHIUM ION SECONDARY BATTERY

(71) Applicants: HONDA MOTOR CO., LTD., Tokyo (JP); SUMITOMO ELECTRIC INDUSTRIES, LTD., Osaka (JP)

(72) Inventors: Kiyoshi Tanaami, Saitama (JP); Akihisa Tanaka, Saitama (JP); Shintaro Aoyagi, Saitama (JP); Kazuki Okuno, Osaka (JP); Akihisa Hosoe, Osaka (JP); Kikuo Senoo, Osaka (JP); Hiroshi Takebayashi, Osaka (JP)

(73) Assignees: HONDA MOTOR CO., LTD., Tokyo (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 587 days.

This patent is subject to a terminal disclaimer.

(21) Appl. No.: 17/054,697

(22) PCT Filed: May 9, 2019

(86) PCT No.: PCT/JP2019/018563
§ 371 (c)(1),
(2) Date: Nov. 11, 2020

(87) PCT Pub. No.: WO2019/221004
PCT Pub. Date: Nov. 21, 2019

(65) Prior Publication Data
US 2021/0075020 A1    Mar. 11, 2021

(30) Foreign Application Priority Data
May 17, 2018 (JP) ................................ 2018-095344

(51) Int. Cl.
*H01M 4/66* (2006.01)
*H01M 4/02* (2006.01)
(Continued)

(52) U.S. Cl.
CPC .......... *H01M 4/661* (2013.01); *H01M 4/131* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS

2011/0111277 A1    5/2011   Bessho et al.
2013/0040196 A1*   2/2013   Hosoe .................... H01M 4/80
                                                          429/211

(Continued)

FOREIGN PATENT DOCUMENTS

EP    2863457 A1    4/2015
JP    2002-151055 A    5/2002
(Continued)

OTHER PUBLICATIONS

Lu et al, High capacity Li[Ni0.8Co0.1Mn0.1]O2 synthesized by sol-gel andco-precipitation methods as cathode materials for lithium-ion batteries, 2013, Solid State Ionics, 249-250, 105-111 (Year: 2013).*

(Continued)

*Primary Examiner* — Brian R Ohara
*Assistant Examiner* — Michelle T Leonard
(74) *Attorney, Agent, or Firm* — WHDA, LLP (57) ABSTRACT

In a lithium ion secondary battery (1), a positive electrode (2) and a negative electrode (3) are alternately adjacent to each other via separators (4) and (5). The positive electrode (Continued)

(2) includes a positive electrode current collector composed of a metal porous body, a first positive electrode active material (21) held on one side of the positive electrode current collector, and a second positive electrode active material (22) held on the other side. The negative electrode (3) includes a negative electrode current collector composed of a metal porous body, a first negative electrode active material (31) held on one side of the negative electrode current collector, and a second negative electrode active material (32) held on the other side. The first positive electrode active material (21) faces the first negative electrode active material (31), and the positive electrode active material (22) faces the second negative electrode active material (32).

4 Claims, 4 Drawing Sheets

(51) Int. Cl.
    *H01M 4/131*    (2010.01)
    *H01M 4/133*    (2010.01)
    *H01M 4/134*    (2010.01)
    *H01M 4/505*    (2010.01)
    *H01M 4/525*    (2010.01)
    *H01M 10/0525*    (2010.01)

(52) U.S. Cl.
    CPC ........... *H01M 4/505* (2013.01); *H01M 4/525* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2014/0306665 A1* | 10/2014 | Kim | H01M 4/667 |
| | | | 156/60 |
| 2014/0342246 A1 | 11/2014 | Kim | |
| 2016/0190642 A1 | 6/2016 | Fukunaga et al. | |
| 2016/0276703 A1 | 9/2016 | Chung et al. | |

FOREIGN PATENT DOCUMENTS

| | | | | |
|---|---|---|---|---|
| JP | 2006-190556 A | | 7/2006 | |
| JP | 2009-32444 A | | 2/2009 | |
| JP | 2009032444 A | * | 2/2009 | |
| JP | 2011-204563 A | | 10/2011 | |
| JP | 2013-20735 A | | 1/2013 | |
| JP | 2014-225430 A | | 12/2014 | |
| JP | 2015-037012 A | | 2/2015 | |
| JP | 2015-37024 A | | 2/2015 | |
| JP | 2017-501535 A | | 1/2017 | |
| JP | 2018-022568 A | | 2/2018 | |
| KR | 20160005555 A | | 1/2016 | |
| KR | 20170141141 A | * | 12/2017 | .......... H01M 10/052 |

OTHER PUBLICATIONS

Wu et al, Prelithiation Activates Li(Ni0.5Mn0.3Co0.2)O2 for High Capacity and Excellent Cycling Stability, 2015, Nano Letters, 15, 5590-5596 (Year: 2015).*
Belharouak et al, Li(Ni1/3Co1/3Mn1/3)O2 as a suitable cathode for high power applications, 2003, Journal of Power Sources, 123, 247-252 (Year: 2003).*
Zhang et al, Different types of pre-lithiated hard carbon as negative electrode material for lithium-ion capacitors, 2016, Electrochimica Acta, 187, 134-142 (Year: 2016).*
Lee et al., Improvement of long-term cycling performance of Li[Ni0.8Co0.15Al0.05]O2 by AlF3 coating, 2013, Journal of Power Sources, 234, 201-2017 (Year: 2013).*
Yoo et al., Surface Modification of Li(Ni0.6Co0.2Mn0.2)O2 Cathode Materials by Nano-Al2O3 to Improve Electrochemical Performance in Lithium-Ion Batteries, 2017, Materials, 10, 127-1283 (Year: 2017).*
Jiang et al., Structure, Electrochemical Properties, and Thermal Stability Studies of Li(Ni0.2Co0.6Mn0.2)O2, 2005, Journal of the Electrochemical Society, 152(9), A1874-A1878 (Year: 2005).*
International Search Report dated Aug. 13, 2019, issued in counterpart International Application No. PCT/JP2019/018563. (2 pages).
Office Action dated Jan. 31, 2023, issued in counterpart JP Application No. 2020-519596, with English translation. (6 pages).
Schipper, F. et al, A Brief Review: Past, Present and Future of Lithium Ion Batteries, Russian Journal Of Electrochemistry, 2016, vol. 52, No. 12, pp. 1095-1121, ISSN: 1023-1935, cited in EP Office Action dated Jan. 21, 2022. (27 pages).
Office Action dated Jan. 21, 2022, issued in counterpart EP Application No. 19802623.9. (7 pages).
Extended European Search Report dated Jun. 7, 2021, issued in counterpart EP Application No. 19802623.9. (10 pages).

* cited by examiner

LITHIUM ION SECONDARY BATTERY

TECHNICAL FIELD

The present invention relates to a lithium ion secondary battery.

BACKGROUND ART

Conventionally, a lithium ion secondary battery comprising the first active material layer having 0.1 μm or more and less than 5 μm of a particle size of the active material and the second active material layer having 5 to 20 μm of a particle size of the active material on a current collector, and comprising an electrode having 20 to 30 μm of a thickness of each active material layer has been known (for example, refer to Patent Literature 1).

Patent Literature 1 discloses that the lithium ion secondary battery comprising the above electrode can improve the output density without lowering the energy density.

CITATION LIST

Patent Literature

Patent Literature 1: Japanese Patent Laid-Open No. 2002-151055

SUMMARY OF INVENTION

Technical Problem

However, the lithium ion secondary battery described in Patent Literature 1 is problematic in that both the energy density and the output density cannot be improved regardless of not lowering the energy density.

In order to solve the above problem, the present applicant has proposed a lithium ion secondary battery in which a positive electrode comprises the first positive electrode active material layer including a high-capacity active material formed on a current collector and the second positive electrode active material layer including a high-power active material formed on the first positive electrode active material layer (Japanese Patent Application No. 2017-101887). In the above lithium ion secondary battery, the first positive electrode active material layer includes the high-capacity active material, thereby allowing increase in the energy density, and the second positive electrode active material layer includes the high-power active material, thereby allowing increase in the output density.

To further improve the energy density and output density of the lithium ion secondary battery, both a positive electrode and a negative electrode may comprise: the first active material layer including a high-capacity active material formed on both sides of a current collector composed of a metal foil; and the second active material layer including a high-power active material formed on the first active material layer, and a lithium ion secondary battery may comprise a structure in which a plurality of the positive electrodes and a plurality of the negative electrodes are alternately adjacent via separators.

However, the positive electrode or negative electrode comprising the first active material layer including the high-capacity active material formed on both sides of the current collector composed of the metal foil and the second active material layer including the high-power active material formed on the first active material layer has a disadvantage of the current collector hindering the movement of lithium ions.

Therefore, during discharge for example, the lithium ions generated in the first negative electrode active material layer and the second negative electrode active material layer move to the positive electrode via the separator interposed between the positive electrode and the negative electrode, and then most of them are consumed in the second positive electrode active material layer, and only the remaining lithium ions reach the first positive electrode active material layer to react with the high-capacity positive electrode active material. As a result, the second positive electrode active material layer becomes a resistance against the movement of lithium ions, decreasing the output of the first positive electrode active material layer.

In a lithium ion secondary battery in which both the positive electrode and the negative electrode comprise the first active material layer including the high-capacity active material formed on both sides of the current collector composed of the metal foil and the second active material layer including the high-power active material formed on the first active material layer, each active material layer is formed by applying and drying a paste including each active material in the surface of the above current collector. The resultant thickness of the active material layer is only about 150 μm at the maximum, which is a disadvantage of failing to obtain a sufficient energy density.

Furthermore, in the lithium ion secondary battery in which both the positive electrode and the negative electrode comprise the first active material layer including the high-capacity active material formed on both sides of the current collector composed of the metal foil and the second active material layer including the high-power active material formed on the first active material layer, the expansion and contraction rates between the first active material layer and the second active material layer are different, and therefore repeated charge-and-discharge at a high rate easily occurs slippage of the interface layer between the first active material layer and the second active material layer, leading to a disadvantage of failing to obtain sufficient charge-and-discharge cycle characteristics.

The object of the present invention is to eliminate such disadvantage and to provide a lithium ion secondary battery having excellent energy density and output density as well as excellent charge-and-discharge cycle characteristics.

Solution to Problem

In order to achieve such object, a lithium ion secondary battery according to the present invention comprises a structure in which at least one positive electrode and at least one negative electrode are alternately adjacent to each other via a separator, the at least one positive electrode comprising: a positive electrode current collector composed of a metal porous body having a three-dimensional network structure; a first positive electrode active material including a high-capacity active material held on one side of the positive electrode current collector; and a second positive electrode active material including a high-power active material held on the other side of the positive electrode current collector, and the at least one negative electrode comprising: a negative electrode current collector composed of a metal porous body having a three-dimensional network structure; a first negative electrode active material including a high-capacity active material held on one side of the negative electrode current collector; and a second negative electrode active material including a high-power active material held on the other side of the negative electrode current collector, wherein the first positive electrode active material faces the first negative electrode active material adjacent thereto via a first separator, and the second positive electrode active material faces the second negative electrode active material of the negative electrode adjacent thereto via a second separator.

According to the lithium ion secondary battery of the present invention, both the above positive electrode and the above negative electrode have the above metal porous body as a current collector. The above metal porous body has a three-dimensional network structure in which columnar skeletons are three-dimensionally connected. In the above positive electrode, the above first positive electrode active material is held on one side of the above current collector, and the second positive electrode active material is held on the other side, and in the above negative electrode, the above first negative electrode active material is held on one side of the above current collector, and the second negative electrode active material is held on the other side. As a result, in the above positive electrode and the above negative electrode, lithium ions can freely move within the electrode without being hindered by the current collector.

The lithium ion secondary battery of the present invention comprises a structure in which at least one of the above positive electrodes and at least one of the above negative electrodes are alternately adjacent to each other via a separator, wherein the first positive electrode active material of the positive electrode faces the first negative electrode active material of the negative electrode adjacent thereto via the first separator, and the second positive electrode active material faces the second negative electrode active material of the negative electrode adjacent thereto via the second separator.

As a result, the first positive electrode active material can exchange lithium ions with the first negative electrode active material via the first separator, and the second positive electrode active material can exchange lithium ions with the second negative electrode active material via the second separator. In other words, in the lithium ion secondary battery of the present invention, lithium ions can be transferred from one to the other high-capacity active materials or high-power active materials between the positive electrode and the negative electrode adjacent to each other.

Therefore, in the lithium ion secondary battery of the present invention, output drop can be suppressed, and excellent output density can be obtained from additional output generated by parallel battery reactions of both high-capacity active materials or both high-power active materials between the positive electrode and the negative electrode adjacent to each other.

In addition, in the lithium ion secondary battery of the present invention, the above positive electrode active material or the above negative electrode active material is held on the above metal porous body, and therefore any one or both of the above first positive electrode active material and the above second positive electrode active material in the positive electrode, and any one or both of the above first negative electrode active material and the above second negative electrode active material in the negative electrode can have a thickness of 150 μm or more, allowing excellent energy density to be obtained.

Furthermore, in the lithium ion secondary battery of the present invention, the above positive electrode active material or the above negative electrode active material is held on the above metal porous body, and therefore slippage of the interface layer between the first positive electrode active material and the second positive electrode active material or the interface layer between the first negative electrode active material and the second negative electrode active material is suppressed during the repeated charge-and-discharge cycle at high rates, allowing excellent charge-and-discharge cycle characteristics to be obtained.

In the lithium ion secondary battery of the present invention, examples of the high-capacity active material included in the above first positive electrode active material include at least one selected from the group consisting of $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, and $Li(Ni_{0.8}Co_{0.15}Al_{0.05})O_2$, and examples of the high-power active material included in the above second positive electrode active material include at least one selected from the group consisting of $Li(Ni_{1/6}Co_{4/6}Mn_{1/6})O_2$ and $Li(Ni_{1/3}Co_{1/3}Mn_{1/3})O_2$.

In addition, in the lithium ion secondary battery of the present invention, examples of the high-capacity active material included in the above first negative electrode active material include at least one selected from the group consisting of artificial graphite, natural graphite, Si, and SiO, and examples of the high-power active material included in the above second negative electrode active material include hard carbon.

DESCRIPTION OF EMBODIMENTS

Hereinafter, embodiments of the present invention will be described in more detail with reference to the accompanying drawings.

Figure 1:
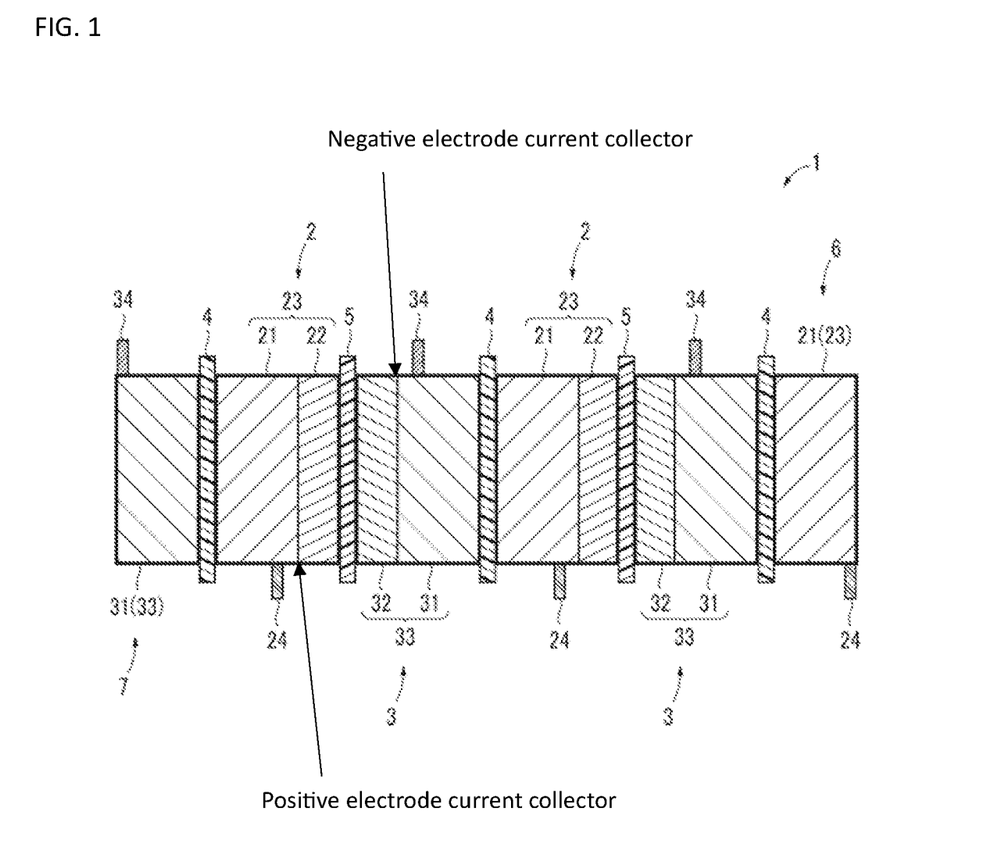
FIG. 1 is an explanatory sectional view showing a configuration example of a lithium ion secondary battery of the present invention.

As shown in FIG. 1, the lithium ion secondary battery 1 of the present embodiment comprises a structure in which the same number of the first positive electrodes 2 and the first negative electrodes 3 are alternately adjacent to each other via the first separator 4 or the second separator 5, wherein the second positive electrode 6 is provided at one end and the second negative electrode 7 is provided at the other end.

The first positive electrode 2 comprises: a current collector, not shown in the Figure; a positive electrode active material 23 comprising a first positive electrode active material 21 including a high-capacity active material held on one side of the current collector and a second positive electrode active material 22 including a high-power active material held on the other side; and a tab 24 connected to the current collector.

The first negative electrode 3 comprises: a current collector, not shown in the Figure; a negative electrode active material 33 comprising a first negative electrode active material 31 including a high-capacity active material held on one side of the current collector and a second negative electrode active material 32 including a high-power active material held on the other side; and a tab 34 connected to the current collector. The above current collector of the positive electrode 2 or the negative electrode 3 is composed of a metal porous body that has a three-dimensional network structure in which columnar skeletons are three-dimensionally connected and comprises open cells.

In addition, the second positive electrode 6 comprises exactly the same configuration as the first positive electrode 2, except that the positive electrode active material 23 comprises only any one of the first positive electrode active material 21 and the second positive electrode active material 22. FIG. 1 shows a case where a positive electrode active material 23 of the second positive electrode 6 comprises the first positive electrode active material 21.

In addition, the second negative electrode 7 comprises exactly the same configuration as the first negative electrode 3, except that the negative electrode active material 33 comprises only any one of the first negative electrode active material 31 and the second negative electrode active material 32. FIG. 1 shows a case where a negative electrode active material 33 of the second negative electrode 7 comprises the first negative electrode active material 31.

The first positive electrode active material 21 of the first positive electrode 2 faces the first negative electrode active material 31 of the first negative electrode 3 adjacent thereto via the first separator 4, and the second positive electrode active material 22 faces the second negative electrode active material 32 of the first negative electrode 3 adjacent thereto via the second separator 5. In addition, for the second positive electrode 6, when the negative electrode active material 33 of the first negative electrode 3 adjacent thereto via the first separator 4 or the second separator 5 is the first negative electrode active material 31, the positive electrode active material 23 comprises only the first positive electrode active material 21, and when the negative electrode active material 33 is the second negative electrode active material 32, the positive electrode active material 23 comprises only the second positive electrode active material 22.

Similarly, for the second negative electrode 7, when the positive electrode active material 23 of the first positive electrode 2 adjacent thereto via the first separator 4 or the second separator 5 is the first positive electrode active material 21, the negative electrode active material 33 comprises only the first negative electrode active material 31, and when the positive electrode active material 23 is the second positive electrode active material 22, the negative electrode active material 33 comprises only the second negative electrode active material 32.

The above metal porous body constituting the above current collector of the positive electrodes 2 and 6 or the negative electrodes 3 and 7 is made of a conductive metal such as aluminum, nickel, copper, stainless steel, or titanium, and those that can be suitably used have a porosity of 90 to 98%, a number of pores (cells) of 46 to 50/inch, a pore diameter of 0.4 to 0.6 mm, a specific surface area of 4500 to 5500 $m^2/m^3$, and a thickness of 0.8 to 1.2 mm. The above metal porous body is preferably made of aluminum when used as a positive electrode current collector, and is preferably made of copper when used as a negative electrode current collector.

The above metal porous body made of aluminum can be produced by applying carbon paint to an urethane foam with open cells to perform a conductive treatment, using a plating bath including 1-ethyl-3-methylimidazolium chloride and aluminum chloride ($AlCl_3$) in a molar ratio of 33:67 and further including a small amount of phenanthroline to perform electroplating in an inert atmosphere to form a predetermined amount of aluminum layer, and thermally decomposing and removing the urethane foam and carbon paint under the condition where excessive oxidation of the aluminum surface is suppressed in an oxygen-containing atmosphere at a temperature in the range of 500 to 660° C. In addition, the above metal porous body made of copper can be produced by applying carbon paint to an urethane foam with open cells to perform a conductive treatment, forming a predetermined amount of copper layer, thermally decomposing and removing the urethane foam and carbon paint, and reducing the oxidized copper layer under hydrogen gas atmosphere. As the metal porous body produced in this manner, "Aluminum Celmet" (registered trademark) manufactured by Sumitomo Electric Industries, Ltd. or "Celmet" (registered trademark) of copper or nickel can be used.

In the positive electrode active material 23, the thickness of the first positive electrode active material 21 held on one side of the current collector is preferably thicker than the thickness of the second positive electrode active material 22 held on the other side, and in the negative electrode active material 33, the thickness of the first negative electrode active material 31 held on one side of the current collector is preferably thicker than the thickness of the second negative electrode active material 32 held on the other side. In this case, specifically, the first positive electrode active material 21 or the first negative electrode active material 31 preferably has a thickness in the range of 100 to 250 μm, and the second positive electrode active material 22 or the second negative electrode active material 32 preferably has a thickness in the range of 50 to 150 μm.

In the lithium ion secondary battery 1 of the present embodiment, examples of the high-capacity active material included in the first positive electrode active material 21 include at least one selected from the group consisting of $Li(Ni_{5/10}Co_{2/10}Mn_{3/10})O_2$, $Li(Ni_{6/10}Co_{2/10}Mn_{2/10})O_2$, and $Li(Ni_{8/10}Co_{1/10}Mn_{1/10})O_2$, and $Li(Ni_{0.8}Co_{0.15}Al_{0.05})O_2$, and examples of the high-power active material included in the second positive electrode active material 22 include at least one selected from the group consisting of $Li(Ni_{1/6}Co_{4/6}Mn_{1/6})O_2$, $Li(Ni_{1/3}Co_{1/3}Mn_{1/3})O_2$, $LiCoO_2$, and $LiNiO_2$.

In addition, in the lithium ion secondary battery 1 of the present embodiment, examples of the high-capacity active material included in the first negative electrode active material 31 include at least one selected from the group consisting of artificial graphite, natural graphite, Si, and SiO, and examples of the high-power active material included in the second negative electrode active material 32 include hard carbon or soft carbon.

In addition, as the first separator 4 or the second separator 5, a microporous film made of polyethylene, polypropylene, or the like can be used. Both the first separator 4 and the second separator 5 may be made of the same material or may be made of different materials.

A method for producing the lithium ion secondary battery of the present embodiment will be described.

<Production of Positive Electrode>

A slurry for the first positive electrode active material is prepared by mixing one selected from the group consisting of Li(Ni$_{5/10}$Co$_{2/10}$Mn$_{3/10}$)O$_2$, Li(Ni$_{6/10}$Co$_{2/10}$Mn$_{2/10}$)O$_2$, Li(Ni$_{8/10}$Co$_{1/10}$Mn$_{1/10}$)O$_2$, and Li(Ni$_{0.8}$Co$_{0.15}$Al$_{0.05}$)O$_2$ as a high-capacity active material, polyvinylidene fluoride (PVDF) as a binder, and carbon black as a conductive aid in a mass ratio of high-capacity active material:binder:conductive aid=80 to 99:0.5 to 19.5:0.5 to 19.5 so as to obtain a total amount of 100, and then by diluting with an organic solvent such as N-methylpyrrolidone.

A slurry for the second positive electrode active material is prepared by mixing one selected from the group consisting of Li(Ni$_{1/6}$Co$_{4/6}$Mn$_{1/6}$)O$_2$ and Li(Ni$_{1/3}$Co$_{1/3}$Mn$_{1/3}$)O$_2$ as a high-power active material, polyvinylidene fluoride (PVDF) as a binder, and carbon black as a conductive aid in a mass ratio of high-power active material:binder:conductive aid=80 to 99:0.5 to 19.5:0.5 to 19.5 so as to obtain a total amount of 100, and then by diluting with an organic solvent such as N-methylpyrrolidone.

Subsequently, the above slurry for the first positive electrode active material is applied to one side of the current collector composed of the above metal porous body by, for example, extruding from a nozzle at a predetermined pressure. The current collector composed of the above metal porous body having the above slurry for the first positive electrode active material applied thereto is dried in the atmosphere at a temperature in the range of 90 to 130° C. for 0.5 to 3 hours. The above slurry for the second positive electrode active material is applied to the other side of the current collector composed of the above metal porous body by, for example, extruding from a nozzle at a predetermined pressure.

The current collector composed of the above metal porous body having the above slurry for the first positive electrode active material and the slurry for the second positive electrode active material applied thereto is dried in the atmosphere at a temperature in the range of 90 to 130° C. for 0.5 to 3 hours to form the positive electrode active material 23 comprising the first positive electrode active material 21 held on one side of the current collector and the second positive electrode active material 22 held on the other side, and is roll-pressed so that each of the positive electrode active materials has a predetermined density. The first positive electrode 2 is obtained by drying in vacuum at a temperature in the range of 110 to 130° C. for 11 to 13 hours.

In addition, the second positive electrode 6 is obtained in exactly the same manner as the first positive electrode 2, except that only any one of the above slurry for the first positive electrode active material and the above slurry for the second positive electrode active material is applied to one side of the current collector composed of the above metal porous body.

<Production of Negative Electrode>

The slurry for the first negative electrode active material is prepared by mixing at least one selected from the group consisting of artificial graphite, natural graphite, Si, and SiO as a high-capacity active material, at least one selected from the group consisting of carboxymethyl cellulose, styrene-butadiene rubber, sodium polyacrylate, and polyvinylidene fluoride as a binder, and carbon black as a conductive aid in a mass ratio of high-capacity active material:binder:conductive aid=80 to 99.5:0.5 to 20:0 to 10 so as to obtain a total amount of 100, and then by diluting with organic solvent such as N-methylpyrrolidone or pure water.

The slurry for the second negative electrode active material is prepared by mixing hard carbon as a high-capacity active material, at least one selected from the group consisting of carboxymethyl cellulose, styrene-butadiene rubber, sodium polyacrylate, and polyvinylidene fluoride as a binder, and carbon black as a conductive aid in a mass ratio of high-capacity active material:binder:conductive aid=80 to 99.5:0.5 to 20:0 to 10 so as to obtain a total amount of 100, and then by diluting with organic solvent such as N-methylpyrrolidone or pure water.

In exactly the same manner as the first positive electrode 2 or the second positive electrode 6, except for using the above slurry for the first negative electrode active material and the above slurry for the second negative electrode active material instead of the above slurry for the first positive electrode active material and the above slurry for the second positive electrode active material, the first negative electrode 3 or the second negative electrode 7 is obtained by applying the slurries to the current collector composed of the above porous metal body, drying in the atmosphere, roll-pressing, and further drying in vacuum.

<Production of Lithium Ion Secondary Battery>

The same number of the first positive electrodes 2 and the first negative electrodes 3 are alternately provided via the first separator 4 or the second separator 5, and the second positive electrode 6 is provided at one end and the second negative electrode 7 is provided at the other end. In this case, the first positive electrode active material 21 of the first positive electrode 2 faces the first negative electrode active material 31 of the first negative electrode 3 adjacent thereto via the first separator 4, and the second positive electrode active material 22 faces the second negative electrode active material 32 of the first negative electrode 3 adjacent thereto via the second separator 5.

In addition, when any one end of the first positive electrode 2 and the first negative electrode 3 that are alternately provided via the first separator 4 or the second separator 5 is the first positive electrode active material 21 of the first positive electrode 2, the second negative electrode 7 comprising the negative electrode active material 33 consisting of only the first negative electrode active material 31 is provided at the above end via the first separator 4. In addition, when any one end of the first positive electrode 2 and the first negative electrode 3 that are alternately provided via the first separator 4 or the second separator 5 is the second positive electrode active material 22 of the first positive electrode 2, the second negative electrode 7 comprising the negative electrode active material 33 consisting of only the second negative electrode active material 32 is provided at the above end via the second separator 5.

In addition, when any other end of the first positive electrode 2 and the first negative electrode 3 that are alternately provided via the first separator 4 or the second separator 5 is the first negative electrode active material 31 of the first negative electrode 3, the second positive electrode 6 comprising the positive electrode active material 23 consisting of only the first positive electrode active material 21 is provided at the above end via the first separator 4. In addition, when any other end of the first positive electrode 2 and the first negative electrode 3 that are alternately provided via the first separator 4 or the second separator 5 is the second negative electrode active material 32 of the first negative electrode 3, the second positive electrode 6 comprising the positive electrode active material 23 consisting of only the second positive electrode active material 22 is provided at the above end via the second separator 5.

The lithium ion secondary battery 1 of the present embodiment is obtained by impregnating the first separator 4 and the second separator 5 with an electrolytic solution and then by sealing a container so that the tabs 24 and 34 are exposed from the container.

Examples of the above electrolytic solution which can be used include those obtained by dissolving supporting salts such as $LiPF_6$, $LiBF_4$, or $LiClO_4$ in a solvent such as ethylene carbonate, propylene carbonate, dimethyl carbonate, diethyl carbonate, or ethyl methyl carbonate at a concentration in the range of 0.1 to 3 mol/L, preferably in the range of 0.6 to 1.5 mol/L.

Examples and Comparative Examples of the present invention will be shown as follows.

EXAMPLES

Example 1

In the present Example, the first positive electrode 2 was prepared by using those made of aluminum and having a porosity of 95%, a number of pores (cells) of 46 to 50/inch, a pore diameter of 0.5 mm, a specific surface area of 5000 $m^2/m^3$, a thickness of 1.0 mm, a length of 150 mm, and a width of 200 mm (Celmet (registered trademark) manufactured by Sumitomo Electric Industries, Ltd.) as a current collector composed of a metal porous body having a three-dimensional network structure in which columnar skeletons are three-dimensionally connected (hereinafter abbreviated as "three-dimensional skeleton current collector").

The slurry for the first positive electrode active material including a high-capacity active material was applied to an area of 80 mm in length and 150 mm in width at the center of one side of the above three-dimensional skeleton current collector. Subsequently, the slurry for the second positive electrode active material including a high-power active material was applied to an area corresponding to the area to which the above slurry for the first positive electrode active material was applied, on the other side of the above three-dimensional skeleton current collector.

The above slurry for the first positive electrode active material was prepared by weighing $Li(Ni_{5/10}Co_{2/10}Mn_{3/10})O_2$ as a high-capacity active material, polyvinylidene fluoride (PVDF) as a binder, and carbon black as a conductive aid so that a mass ratio of high-capacity active material:binder:conductive aid was 94:2:4 and by mixing them in N-methylpyrrolidone. In addition, the above slurry for the second positive electrode active material was prepared by weighing $Li(Ni_{1/6}Co_{4/6}Mn_{1/6})O_2$ as a high-power active material, polyvinylidene fluoride (PVDF) as a binder, and carbon black as a conductive aid so that a mass ratio of high-power active material:binder:conductive aid was 94:2:4 and by mixing them in N-methylpyrrolidone.

The above three-dimensional skeleton current collector obtained by applying the above slurry for the first positive electrode active material to one side and applying the above slurry for the second positive electrode active material to the other side was dried in the atmosphere at a temperature of 120° C. for 12 hours, roll-pressed, and further dried in vacuum at a temperature of 120° C. for 12 hours.

The first positive electrode 2 was obtained by punching into a shape having: a coating area of 30 mm in length and 40 mm in width having the above slurry for the first positive electrode active material and the above slurry for the second positive electrode active material applied thereto; and the tab 24 of 15 mm in length and 30 mm width not having the above slurry for the first positive electrode active material and the above slurry for the second positive electrode active material applied thereto, in contact with the coating area.

In the first positive electrode 2, the positive electrode active material layer 23 was formed by holding the first positive electrode active material 21 formed of the above slurry for the first positive electrode active material on one side of the above three-dimensional skeleton current collector and by holding the second positive electrode active material 22 formed of the above slurry for the second positive electrode active material on the other side. In the present Example, the first positive electrode active material 21 held on one side of the above three-dimensional skeleton current collector had a thickness of 0.225 mm and a volume density of 3.2 $g/cm^3$, and the second positive electrode active material 22 held on the other side had a thickness of 0.056 mm and a volume density of 3.2 $g/cm^3$. In the present Example, two sheets of the first positive electrodes 2 were prepared.

Prepared in exactly the same manner as in the first positive electrode 2, except that only the above slurry for the first positive electrode active material was applied to one side of the above three-dimensional skeleton current collector, was one sheet of the second positive electrode 6 that had held, on one side of the above three-dimensional skeleton current collector, the positive electrode active material 23 consisting of only the first positive electrode active material 21 formed of the above slurry for the first positive electrode active material.

The first negative electrode 3 was prepared as follows by using those made of copper and having a porosity of 95%, a number of pores (cells) of 46 to 50/inch, a pore diameter of 0.5 mm, a specific surface area of 5000 $m^2/m^3$, a thickness of 1.0 mm, a length of 150 mm, and a width of 80 mm (Celmet (registered trademark) manufactured by Sumitomo Electric Industries, Ltd.) as a three-dimensional skeleton current collector.

The slurry for the first negative electrode active material including a high-capacity active material was applied to an area of 70 mm in length and 70 mm in width at the center of one side of the above three-dimensional skeleton current collector. Subsequently, the slurry for the second negative electrode active material including a high-power active material was applied to an area corresponding to the area to which the above slurry for the first negative electrode active material was applied on the other side of the above three-dimensional skeleton current collector.

The above slurry for the first negative electrode active material was prepared by weighing natural graphite as a high-capacity active material, a mixture of carboxymethyl cellulose and styrene-butadiene rubber as a binder, and carbon black as a conductive aid so that a mass ratio of high-capacity active material:binder:conductive aid was 96.5:2.5:1, and then by mixing them in pure water. In addition, the above slurry for the second negative electrode active material was prepared without a conductive aid by weighing hard carbon as a high-power active material and polyvinylidene fluoride (PVDF) as a binder so that a mass ratio of high-power active material:binder was 98:2, and then by mixing them in N-methylpyrrolidone.

The above three-dimensional skeleton current collector obtained by applying the above slurry for the first negative electrode active material to one side and applying the above slurry for the second negative electrode active material to the other side was dried in the atmosphere at a temperature of 120° C. for 12 hours, roll-pressed, and further dried in vacuum at a temperature of 120° C. for 12 hours.

The first negative electrode 3 of the present Example was obtained by punching into a shape having: coating area of 34 mm in length and 44 mm in width having the above slurry for the first negative electrode active material and the above slurry for the second negative electrode active material applied thereto; and the tab 34 of 15 mm in length and 30 mm in width not having the above slurry for the first negative electrode active material and the above slurry for the second negative electrode active material applied thereto, in contact with the coating area.

In the first negative electrode 3, the negative electrode active material 33 was formed by holding the first negative electrode active material 31 formed of the above slurry for the first negative electrode active material on one side of the above three-dimensional skeleton current collector and by holding the second negative electrode active material 32 formed of the above slurry for the second negative electrode active material on the other side. In the present Example, the first negative electrode active material 31 held on one side of the above three-dimensional skeleton current collector had a thickness of 0.212 mm and a volume density of 1.7 g/cm$^3$, and the second negative electrode active material layer 32 held on the other side had a thickness of 0.082 mm and a volume density of 1.1 g/cm$^3$. In the present Example, two sheets of the first negative electrodes 3 were prepared.

Prepared in exactly the same manner as in the first negative electrode 3, except that only the above slurry for the first negative electrode active material was applied to one side of the above three-dimensional skeleton current collector, was one sheet of the second negative electrode 7 that had held, on one side of the above three-dimensional skeleton current collector, the negative electrode active material 33 consisting of only the first negative electrode active material 31 formed of the above slurry for the first negative electrode active material.

In the pouch of aluminum laminate, the first positive electrode 2 and the first negative electrode 3 were provided such that the first separator 4 or the second separator 5 was sandwiched therebetween and the tabs 24 and 34 were exposed outside the pouch. In addition, the second positive electrode 6 was provided at one end such that the first separator 4 was sandwiched between the second positive electrode 6 and the adjacent first negative electrode 3 and the tab 24 was exposed outside the pouch, and the second negative electrode 7 was provided at the other end such that the first separator 4 was sandwiched between the second negative electrode 7 and the adjacent first positive electrode 2 and the tab 34 was exposed outside the pouch. The lithium ion secondary battery 1 comprising the configuration shown in FIG. 1 was produced by impregnating the first separator 4 and the second separator 5 with the electrolytic solution and then vacuum-sealing.

A polyethylene microporous film having a thickness of 15 μm was used as the first separator 4 and the second separator 5. In addition, as the above electrolytic solution, used were those obtained by dissolving LiPF$_6$ as a supporting salt at a concentration of 1.2 mol/L in a mixed solvent that had been mixed with ethylene carbonate, dimethyl carbonate, and diethyl carbonate in a volume ratio of 40:30:30.

In the lithium ion secondary battery 1 of the present Example, the first positive electrode active material 21 of the first positive electrode 2 faced the first negative electrode active material 31 of the first negative electrode 3 or the second negative electrode 7 adjacent thereto via the first separator 4, and the second positive electrode active material 22 faced the second negative electrode active material 32 of the first negative electrode 3 adjacent thereto via the second separator 5. In addition, the first negative electrode active material 31 of the first negative electrode 3 faced the first positive electrode active material 21 of the first positive electrode 2 or the second positive electrode 6 adjacent thereto via the first separator 4.

<Calculation of Energy Density>

For the lithium ion secondary battery 1 produced in the present Example, the temporary capacity of the positive electrode at a temperature of 25° C. was calculated from the amounts of the active materials of the first positive electrode active material 21 and the second positive electrode active material 22. Based on the above temporary capacity, a current value capable of discharging in 5 hours (0.2 C) was determined.

The lithium ion secondary battery 1 produced in the present Example was subjected to constant current charging at 0.2 C to 4.2 V, constant voltage charging at 4.2 V for 1 hour, and then constant current discharging to 2.4 V at 0.2 C. While the capacity at the above constant current discharge was regarded as the rated capacity (mAh/g), an average voltage (V) was defined as a voltage when the capacity was ½ of the rated capacity in the charge-and-discharge curve during the constant current discharge, and the energy density (Wh/g) was calculated from the following equation (1).

$$\text{Energy density}(Wh/g) = \text{Rated capacity}(mAh/g) \times \text{Average voltage}(V) \tag{1}$$

Figure 3:
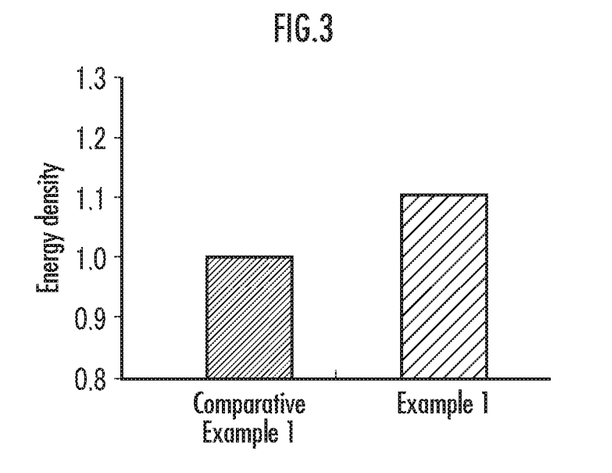
FIG. 3 is a graph showing the energy density in the lithium ion secondary battery according to an example of the present invention.

The results are shown in FIG. 3. In FIG. 3, the energy density (Wh/g) in the lithium ion secondary battery 11 of Comparative Example 1 described below is set to 1 and the ratio value respective to this is shown.

<Calculation of Output Density>

In order to obtain a capacity having a charging rate (SOC) of 50% with respect to the above rated current at a temperature of 25° C., charging was performed at 0.2 C for 2.5 hours, and the open circuit voltage (OCV) at this time was defined as $E_0$.

Discharging was performed at a predetermined current value for 10 seconds while measuring the voltage, and then the discharge capacity was charged at 0.2 C, and such operation was repeated with changing the predetermined current value from 0.5 C to 3.0 C by 0.5 C. The current value was plotted on the horizontal axis and the voltage for each current value was plotted on the vertical axis, and the slope of the straight line obtained was the resistance R.

The cutoff voltage $E_{cutoff}$ was set to 2.4 V, and the above resistance R and the above open circuit voltage $E_0$ were used to calculate the output density W from the following equation (2).

$$W = (|E_{cutoff} - E_0|/R) \times E_{cutoff} \tag{2}$$

Figure 4:
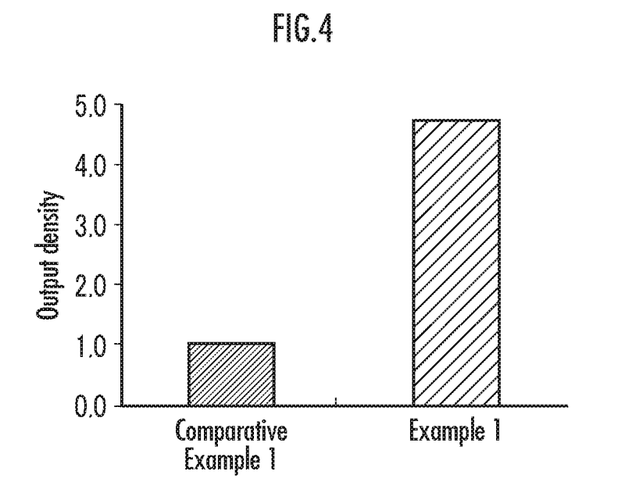
FIG. 4 is a graph showing the output density in the lithium ion secondary battery according to an example of the present invention.

The results are shown in FIG. 4. In FIG. 4, the energy density in the lithium ion secondary battery of Comparative Example 1 described below is set to 1 and the ratio value respective to this is shown.

<Evaluation of Durability: Capacity Retention Rate>

Figure 5:
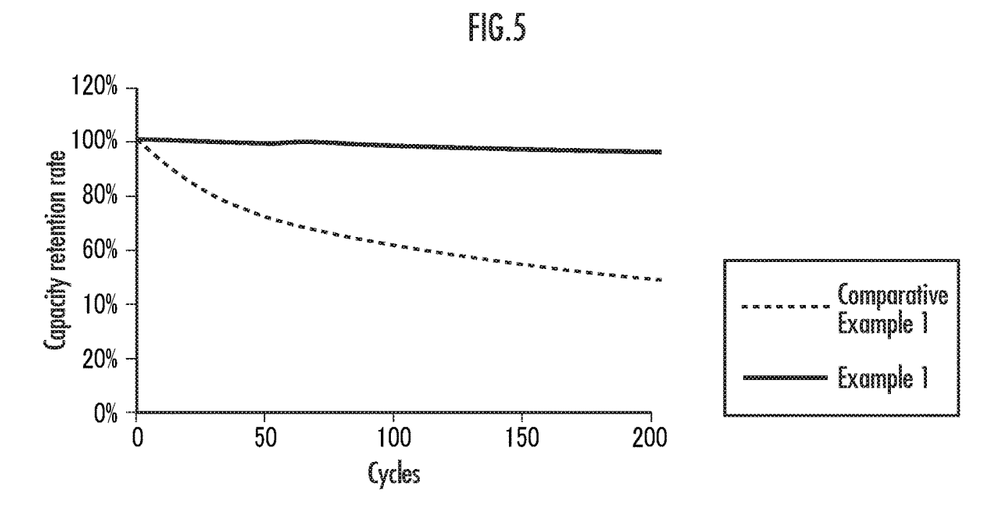
FIG. 5 is a graph showing change in capacity retention rate with the number of cycles in the lithium ion secondary battery according to an example of the present invention.

An operation during one cycle was defined as constant-current charging at 0.5 C to 4.2 V and then constant-current discharging at 0.5 C to 2.4 V for the above rated capacity, and such operation was repeated at 45° C. for 200 cycles. FIG. 5 shows changes in the capacity retention rate with respect to the number of cycles.

<Evaluation of Durability: Resistance Increase Rate>

Figure 6:
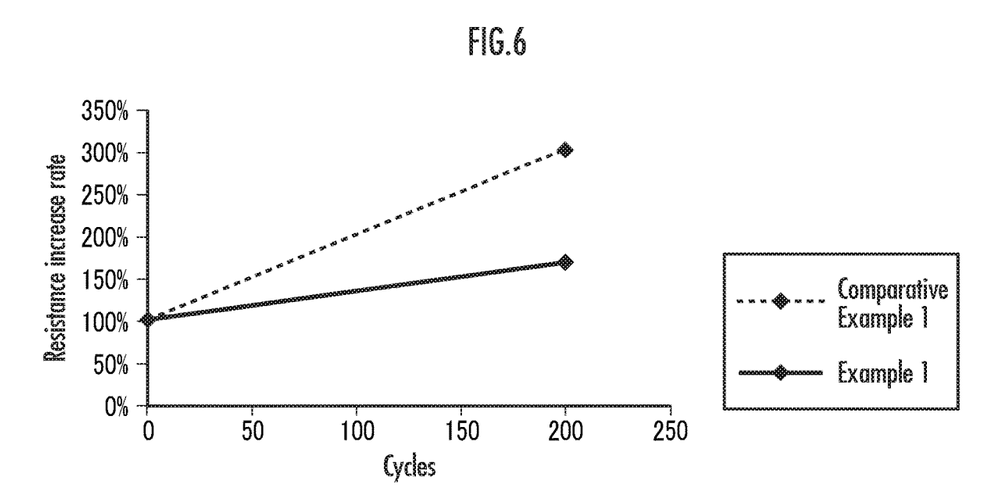
FIG. 6 is a graph showing change in internal resistance with the number of cycles in the lithium ion secondary battery according to an example of the present invention.

For the lithium ion secondary battery 1 produced in the present Example, the internal resistance before the start of the above operation (0 cycle) and after 200 cycles was measured at the time of measuring the above capacity retention rate. The results are shown in FIG. 6.

Comparative Example 1

Figure 2:
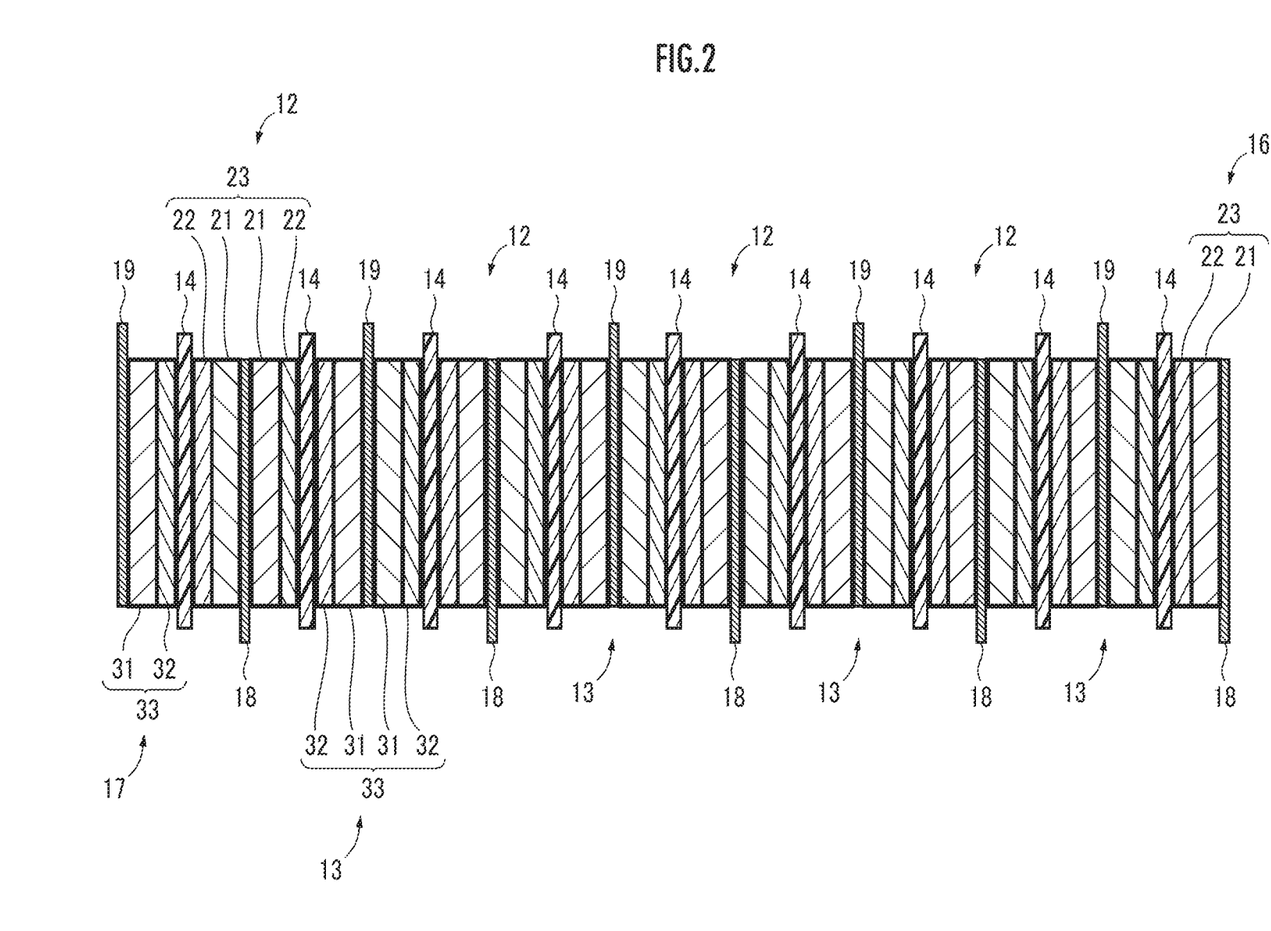
FIG. 2 is an explanatory sectional view showing a configuration example of the conventional lithium ion secondary battery.

As shown in FIG. 2, the lithium ion secondary battery 11 of the present Comparative Example comprises a structure in which the same number of first positive electrodes 12 and first negative electrodes 13 are alternately adjacent to each other via a separator 14, wherein a second positive electrode 16 is provided at one end and a second negative electrode 17 is provided at the other end.

The first positive electrode 12 comprises: a current collector 18 made of an aluminum foil; and a positive electrode active material layer 23 including a first positive electrode active material layer 21 including a high-capacity active material located on both sides of the current collector 18 and a second positive electrode active material layer 22 including a high-power active material located on the first positive electrode active material layer 21 on both sides of the current collector 18, and the portion exposed from the positive electrode active material layer 23 of the current collector 18 is a tab.

The first negative electrode 13 comprises: a current collector 19 made of an copper foil; and a negative electrode active material layer 33 including a first negative electrode active material layer 31 including a high-capacity active material located on both sides of the current collector 19 and a second negative electrode active material layer 32 including a high-power active material located on the first negative electrode active material layer 31 on both sides of the current collector 19, and the portion exposed from the negative electrode active material layer 33 of the current collector 19 is a tab.

In addition, the second positive electrode 16 comprises exactly the same configuration as the first positive electrode 12 except for comprising the positive electrode active material layer 23 only on one side of the current collector 18, and the second negative electrode 17 comprises exactly the same configuration as the first negative electrode 13 except for comprising the negative electrode active material layer 33 only on one side of the current collector 19.

The second positive electrode active material layer 22 of the first positive electrode 12 faces the second negative electrode active material layer 32 of the first negative electrode 13 or the second negative electrode 17 adjacent thereto via the separator 14, and the second positive electrode active material layer 22 of the second positive electrode 16 faces the second negative electrode active material layer 32 of the first negative electrode 13 adjacent thereto via a separator 14.

In the present Comparative Example, the lithium ion secondary battery 11 comprising the configuration shown in FIG. 2 was produced as follows.

A positive electrode was prepared as follows by using an aluminum foil having a width of 20 cm, a length of 1 m, and a thickness of 15 µm.

The slurry for the first positive electrode active material including a high-capacity positive electrode active material was applied to 10 cm center area of the aluminum foil, dried at a temperature of 130° C. for 10 minutes, and pressed with a load of 15 tons by using a roll press at a temperature of 130° C., thereby forming the first positive electrode active material layer. The above slurry for the first positive electrode active material was prepared in exactly the same manner as in the slurry for the first positive electrode active material of Example 1, except for weighing in a mass ratio of high-capacity active material:binder:conductive aid=95:2.5:2.5.

The slurry for the second positive electrode active material including a high-power positive electrode active material was applied on the above first positive electrode active material layer, dried at a temperature of 130° C. for 10 minutes, and pressed with a load of 5 tons by using a roll press at a temperature of 130° C., thereby forming the second positive electrode active material layer. The above slurry for the second positive electrode active material was prepared in exactly the same manner as in the slurry for the second positive electrode active material of Example 1, except for weighing in a mass ratio of high-power active material:binder:conductive aid=95:2.5:2.5.

A positive electrode was obtained by punching the above aluminum foil into a shape having a coating area of 30 mm in length and 40 mm in width and a tab area of 15 mm in length and 30 mm in width adjacent to the coating area.

In the present Comparative Example, on one side of the current collector 18, the first positive electrode active material layer 21 had a thickness of 0.042 mm and a volume density of 3.30 g/cm$^3$, and the second positive electrode active material layer 22 had a thickness of 0.016 mm and a volume density of 2.65 g/cm$^3$. In the present Comparative Example, four sheets of the first positive electrode 12 were prepared.

The second positive electrode 16 comprising the positive electrode active material layer 23 only in one side of the current collector 18 was obtained in exactly the same manner as the first positive electrode 12, except that the positive electrode active material layer 23 was formed only on one side of the current collector 18. In the present Comparative Example, one sheet of the second positive electrode 16 was prepared.

A negative electrode was prepared as follows by using a copper foil having a width of 20 cm, a length of 1 m, and a thickness of 8 µm.

The slurry for the first negative electrode active material including a high-capacity negative electrode active material was applied to 10 cm center area of the above copper foil, dried at a temperature of 130° C. for 10 minutes, and pressed with a load of 15 tons by using a roll press at a temperature of 130° C., thereby forming the first negative electrode active material layer. The above slurry for the first negative electrode active material was prepared by weighing natural graphite as a high-capacity active material, a mixture of carboxymethyl cellulose and styrene-butadiene rubber as a binder, and carbon black as a conductive aid so that a mass ratio of high-capacity active material:binder:conductive aid was 96.5:2.5:1, and then by mixing them in pure water.

The slurry for the second negative electrode active material including a high-power negative electrode active material was applied on the above first negative electrode active material layer, dried at a temperature of 130° C. for 10 minutes, and pressed with a load of 5 tons by using a roll press at a temperature of 130° C., thereby forming the second negative electrode active material layer. The above slurry for the second negative electrode active material was prepared without a conductive aid by weighing hard carbon as a high-power active material and a mixture of carboxymethyl cellulose and styrene-butadiene rubber as a binder so that a mass ratio of high-power active material:binder was 98:2, and then by mixing them in pure water.

A negative electrode was obtained by punching the above copper foil into a shape having a coating area of 34 mm in length and 44 mm in width and a tab area of 15 mm in length and 30 mm in width adjacent to the coating area.

In the present Comparative Example, on one side of the current collector 19, the first negative electrode active material layer 31 had a thickness of 0.039 mm and a volume density of 1.55 g/cm$^3$, and the second negative electrode active material layer 32 had a thickness of 0.024 mm and a volume density of 1.00 g/cm³. In the present Comparative Example, four sheets of the first negative electrode 13 were prepared.

In addition, the second negative electrode 17 comprising the negative electrode active material layer 33 only in one side of the current collector 19 was obtained in exactly the same manner as the first negative electrode 13, except that the negative electrode active material layer 33 was formed only on one side of the current collector 19. In the present Comparative Example, one sheet of the second negative electrode 17 was prepared.

In the pouch of aluminum laminate, the first positive electrode 12 and the first negative electrode 13 were provided such that the separator 14 was sandwiched therebetween and the tab was exposed outside the pouch. In addition, the second positive electrode 16 was provided on one side such that the separator 14 was sandwiched between the second positive electrode 16 and the adjacent first negative electrode 13 and the tab was exposed outside the pouch. The second negative electrode 17 was provided on the other side such that the separator 14 was sandwiched between the second negative electrode 17 and the adjacent first positive electrode 12 and the tab was exposed outside the pouch. The lithium ion secondary battery 11 comprising the configuration shown in FIG. 2 was produced by impregnating the separator 14 with an electrolytic solution and then vacuum-sealing.

As the separator 14, a polyethylene microporous film of 15 μm in thickness was used. In addition, as the above electrolytic solution, used were those obtained by dissolving $LiPF_6$ as a supporting salt at a concentration of 1.2 mol/L in a mixed solvent that had been mixed with ethylene carbonate, dimethyl carbonate, and diethyl carbonate in a volume ratio of 40:30:30.

The lithium ion secondary battery 11 of the present Comparative Example had the same capacity of the lithium ion secondary battery as the lithium ion secondary battery 1 of Example 1.

The energy density and the output density were calculated in exactly the same manner as in Example 1 except that the lithium ion secondary battery 11 obtained in the present Comparative Example was used. The energy density is shown in FIG. 3 and the output density is shown in FIG. 4.

The durability was evaluated in exactly the same manner as in Example 1 except that the lithium ion secondary battery 11 obtained in the present Comparative Example was used. The change in the capacity retention rate with respect to the number of cycles is shown in FIG. 5, and the internal resistances before the start of operation (0 cycle) and after 200 cycles when measuring the capacity retention rate are shown in FIG. 6 as the resistance increase rate.

It is clear from FIGS. 3 to 6 that the lithium ion secondary battery 1 of Example 1 is superior to the lithium ion secondary battery 11 of Comparative Example 1 in both energy density and output density and also in the charge-and-discharge cycle characteristics.

In addition, according to the lithium ion secondary battery 1 of Example 1, the basis weight of the positive electrode active material layer 23 or the negative electrode active material layer 33 per one sheet of the electrode can be increased by using the above three-dimensional skeleton current collector. Therefore, according to the lithium ion secondary battery 1 of Example 1, compared with the lithium ion secondary battery 11 of Comparative Example 1, the number of electrodes can be reduced and the mass of the lithium ion secondary battery can be reduced, and thereby the energy density can be improved.

REFERENCE SIGNS LIST

1: lithium ion secondary battery, 2: first positive electrode, 3: first negative electrode, 4: first separator, 5: second separator, 6: second positive electrode, 7: second negative electrode, 12: first positive electrodes, 13: first negative electrodes, 14: separator, 16: second positive electrode, 17: second negative electrode, 18: current collector, 19: current collector, 21: first positive electrode active material, 22: second positive electrode active material, 23: positive electrode active material, 24: tab 31: first negative electrode active material, 32: second negative electrode active material, 33: negative electrode active material 34: tab

The invention claimed is:

1. A lithium ion secondary battery comprising
a structure in which at least one positive electrode and at least one negative electrode are alternately adjacent to each other via a separator,
the at least one positive electrode comprising:
a positive electrode current collector composed of a metal porous body having a three-dimensional network structure;
a first positive electrode active material including a high-capacity active material held on one side of the positive electrode current collector; and
a second positive electrode active material including a high-power active material held on the other side of the positive electrode current collector, and
the at least one negative electrode comprising:
a negative electrode current collector composed of a metal porous body having a three-dimensional network structure;
a first negative electrode active material including a high-capacity active material held on one side of the negative electrode current collector; and
a second negative electrode active material including a high-power active material held on the other side of the negative electrode current collector,
wherein the first positive electrode active material faces the first negative electrode active material adjacent thereto via a first separator, and the second positive electrode active material faces the second negative electrode active material of the negative electrode adjacent thereto via a second separator,
wherein a thickness of the first positive electrode active material is larger than a thickness of the second positive electrode active material, and a thickness of the first negative electrode active material is larger than a thickness of the second negative electrode active material, and
wherein at least one of the thickness of the first positive electrode active material and the thickness of the first negative electrode active material is in a range of 100 to 250 μm, and at least one of the thickness of the second positive electrode active material and the thickness of the second negative electrode active material is in a range of 50 to 150 μm.

2. The lithium ion secondary battery according to claim 1, wherein the first positive electrode active material comprises at least one selected from a group consisting of $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, and $Li(Ni_{0.8}Co_{0.15}Al_{0.05})O_2$, and
the second positive electrode active material comprises at least one selected from a group consisting of $Li(Ni_{1/6}Co_{4/6}Mn_{1/6})O_2$ and $Li(Ni_{1/3}Co_{1/3}Mn_{1/3})O_2$.

3. The lithium ion secondary battery according to claim 1,
wherein the first negative electrode active material comprises at least one selected from a group consisting of artificial graphite, natural graphite, Si, and SiO, and
the second negative electrode active material comprises hard carbon.

4. The lithium ion secondary battery according to claim 2,
wherein at least one of the thickness of the first positive electrode active material and the thickness of the first negative electrode active material is in a range of 100 to 250 μm, and at least one of the thickness of the second positive electrode active material and the thickness of the second negative electrode active material is in a range of 50 to 150 μm.

* * * * *